United States Patent [19]

Srinivasan et al.

[11] Patent Number: 5,783,629
[45] Date of Patent: *Jul. 21, 1998

[54] THERMOPLASTIC POLYOLEFINS HAVING IMPROVED PAINTABILITY PROPERTIES

[75] Inventors: Sachit Srinivasan, Carrollton; Jeff Her, Grand Prairie, both of Tex.

[73] Assignee: Solvay Engineered Polymers, Grand Prairie, Tex.

[*] Notice: The term of this patent shall not extend beyond the expiration date of Pat. No. 5,498,671.

[21] Appl. No.: 612,397

[22] Filed: Mar. 7, 1996

Related U.S. Application Data

[63] Continuation-in-part of Ser. No. 311,843, Sep. 23, 1994, Pat. No. 5,498,671, which is a continuation of Ser. No. 16,586, Feb. 10, 1993, abandoned.

[51] Int. Cl.$^6$ .............................. C08L 23/00; C08L 51/00
[52] U.S. Cl. .................. 525/63; 525/64; 525/69; 525/71; 525/74; 525/79; 525/78; 525/80; 525/98; 525/240; 428/500; 428/424.2; 428/424.8
[58] Field of Search ............... 525/63, 64, 69, 525/71, 74, 79, 240, 98, 78, 80; 428/500, 424.2, 424.8

[56] References Cited

U.S. PATENT DOCUMENTS

| | | | |
|---|---|---|---|
| 3,862,106 | 1/1975 | Fischer | 525/240 |
| 3,884,993 | 5/1975 | Gros | 525/211 |
| 4,536,547 | 8/1985 | Lundberg et al. | 525/186 |
| 4,607,074 | 8/1986 | Hazelton et al. | 525/240 |
| 4,833,194 | 5/1989 | Kuan et al. | 525/240 |
| 4,843,128 | 6/1989 | Cesare | 525/193 |
| 5,011,891 | 4/1991 | Spenadel | 525/211 |
| 5,162,441 | 11/1992 | Nakata | 525/194 |
| 5,214,103 | 5/1993 | Imao | 525/211 |
| 5,239,000 | 8/1993 | Kimm | 525/240 |

*Primary Examiner*—Mark L. Warzel
*Attorney, Agent, or Firm*—Pennie & Edmonds LLP

[57] ABSTRACT

Thermoplastic polyolefin compositions of a substantially crystalline polyolefin that is a homopolymer of ethylene, propylene or butylene or a copolymer of propylene and a $C_3$–$C_{10}$ alpha-olefin; about 10% to 50% by weight of a first substantially amorphous polyolefin of a terpolymer of ethylene with a $C_3$–$C_{10}$ alpha-olefin and a diene monomer and having a Mooney Viscosity ($ML_{1+4}$, 100° C.) of between about 10 and about 120; optionally, a copolymer of ethylene and a $C_3$–$C_{10}$ alpha-olefin may be present; and about 1 to 20% by weight of a second substantially amorphous polyolefin having a number average molecular weight of between about 1,000 and 15,000 and including (a) a copolymer of ethylene with a $C_3$–$C_{10}$ alpha-olefin; (b) a terpolymer of ethylene with a $C_3$–$C_{10}$ alpha-olefin and a diene monomer; (c) a block copolymer that includes blocks of a $C_3$–$C_{10}$ alpha-olefin, butadiene, isoprene, styrene or alpha-methyl styrene; or (d) the reaction product of one of (a), (b) or (c) with a compound that provides a polar functional group. Also, articles of manufacture of these compositions in the form of a molded or extruded substrate having one or more surfaces, and a coating, such as a polyurethane, present on at least a portion of one or more of the surfaces of the substrate. The coating adheres well to the substrate as evidenced by resistance to immersion in gasoline for at least about 60 minutes with a coating peel area of less than 1% after immersion in gasoline for 30 minutes.

18 Claims, No Drawings

THERMOPLASTIC POLYOLEFINS HAVING IMPROVED PAINTABILITY PROPERTIES

CROSS-REFERENCE TO RELATED APPLICATIONS

This application is a continuation-in-part of application Ser. No. 08/311,843, filed Sep. 23, 1994, now U.S. Pat. No. 5,498,671 which is a continuation of application Ser. No. 08/016,586, filed Feb. 10, 1993, now abandoned.

FIELD OF THE INVENTION

The invention relates to thermoplastic polyolefin compositions which can be molded or extruded into articles of manufacture that are characterized by improved adherence for coating materials such as paints. The invention particularly relates to coated, thermoplastic polyolefin compositions which have improved resistance to petroleum fluids such as gasolines, oils, and the like.

BACKGROUND OF THE INVENTION

Polymer blends can be formed or shaped into lightweight and durable articles useful, for example, as automobile parts, toys, and housings for various types of equipment. Unfortunately, polymer blends such as those formed of polyethylene, polypropylene and rubber are difficult to treat so that the paint durably adheres to the surface of the article. Paint adhesion is a particular concern in the case of blends derived from thermoplastic olefin ("TPO") compositions such as those disclosed U.S. Pat. No. 4,480,065; U.S. Pat. No. 4,412,016 and U.S. Pat. No. 4,439,573.

TPO compositions are blends of synthetic rubber and polyolefins such as polypropylene and polyethylene. Because articles made from TPO compositions have gained acceptance in the automotive industry as body parts and the like, it is important that paint sufficiently adheres to the TPO composition to withstand petroleum fluids such as gasolines and the like.

Articles formed of TPO blends which contain substantial amounts of polypropylene exhibit poor adherence for coating paints. These compositions therefore must be treated prior to applying such coating materials by the application of interlayer primers or pre-treatments to promote adhesion. Unfortunately, articles made from TPO compositions are difficult to treat so that the paint adheres against the action of petroleum fluids such as gasolines which dissolve the interlayer coatings. Many paints either do not adhere to the TPO composition, or peel or chip away under normal use, high humidity conditions, or in the presence of fuels or solvents.

Various methods have been tried to improve the adherence of TPO compositions having substantial amounts of polypropylene and/or rubber for paints. Methods of the art have employed primers or adhesion promoters such as chlorinated polyolefins, as well as surface treatments. Although these methods have improved the adherence of these compositions for coating materials such as paints, these methods have not been entirely satisfactory. For example, adhesion promoters such as chlorinated olefins are suspectable to attack by petroleum fluids such as gasolines. Also, the prior art methods for increasing adherence of polymer compositions are costly and time consuming.

Blends of high and low molecular weight elastomers are generally known in the art, as evidenced by U.S. Pat. Nos. 5,239,000 and 4,843,128. The composition of those type patents are generally mixed with a curing agent and then vulcanized or cured to obtain a product having the necessary mechanical properties. These improved property formulations are useful for precision molded components such as footwear, automobile wiper blades, rubber mounts or other components where the combination of resistance to wear and resistance to impact are required. These formulations are generally not painted or utilized in applications where immersion resistance to gasoline or petroleum fluids is anticipated.

A need therefore exists for polymer compositions that show improved adherence for coatings such as paints to enable manufacture of coated polymer compositions which show improved resistance to attack by such petroleum fluids. The parent cases provide certain useful formulations for this purpose, but the present invention discloses additional, related compositions which demonstrate improved performance over previous formulations.

SUMMARY OF THE INVENTION

The present invention relates to a thermoplastic polyolefin composition consisting essentially of a substantially crystalline polyolefin that is a homopolymer of ethylene, propylene or butylene or a copolymer of propylene and a $C_3$–$C_{10}$ alpha-olefin; about 10% to 50% by weight of a first substantially amorphous polyolefin comprising a terpolymer of ethylene with a $C_3$–$C_{10}$ alpha-olefin and a diene monomer and having a Mooney Viscosity ($ML_{1+4}$, 100° C.) of between about 10 and about 120, optionally being present with another substantially amorphous polyolefin which is a copolymer of ethylene and a $C_3$–$C_{10}$ alpha-olefin; and about 1 to 20% by weight of a second substantially amorphous polyolefin having a number average molecular weight of between about 1,000 and 15,000 and comprising: (a) a copolymer of ethylene with a $C_3$–$C_{10}$ alpha-olefin; (b) a terpolymer of ethylene with a $C_3$–$C_{10}$ alpha-olefin and a diene monomer; (c) a block copolymer that includes blocks of a $C_3$–$C_{10}$ alpha-olefin, butadiene, isoprene, styrene or alpha-methyl styrene; (d) the reaction product of one of (a), (b) or (c) with a compound that provides a polar functional group; or (e) a mixture thereof.

In this composition, the substantially crystalline polyolefin is preferably a polypropylene having at least 30 to 98% crystallinity and is present in an amount of about 40 to 90 percent by weight. The first substantially amorphous polyolefin may be a mixture of the terpolymer in an amount of about 5 to 30% by weight of the composition and the ethylene/$C_3$–$C_{10}$ alpha-olefin copolymer in an amount of about 5 to 20% by weight. Also, the terpolymer of the first substantially amorphous polyolefin may be ethylene with propylene, butylene, hexene or octene and a diene monomer, and the ethylene/$C_3$–$C_{10}$ alpha-olefin copolymer may be a copolymer of ethylene with propylene, butylene, hexene or octene.

Advantageously, the first substantially amorphous polyolefin has a Mooney Viscosity ($ML_{1+4}$, 100° C.) of between about 15 and about 50 and is present in an amount of about 15 and 40 percent by weight, with the alpha-olefin being propylene, ethylene-propylene, butylene, hexene or octene. The first substantially amorphous polyolefin may also be a terpolymer containing at least about 3% by weight of a diene compound of dicyclopentadiene, ethylidene norbornene, hexadiene, isoprene or butadiene.

The second substantially amorphous polyolefin is preferably a liquid having a molecular weight of about 3,000 to 12,000 and is present in an amount of about 3 to 15 percent by weight, with the alpha-olefin of (a), (b), (c), (d) or (e)

being propylene, butylene, hexene or octene. The alpha-olefin of component (a) or (b) of the second substantially amorphous polyolefin may be ethylene with propylene, butylene, hexene or octene; the diene monomer of component (b) may be dicyclopentadiene, ethylidene norbornene, hexadiene, isoprene or butadiene; the block copolymer of component (c) may include blocks of (a) or (b) and ethylene, ethylene-butylene, styrene, butadiene or isoprene; or the reaction product of component (d) may be a compound selected from the group consisting of a $C_1$ to $C_{10}$ carboxylic anhydride, an isocyanante compound, or an acrylate or methacrylate compound. The second substantially amorphous polyolefin may also be a terpolymer containing at least about 3% by weight of a diene monomer selected from the group consisting of dicyclopentadiene, ethylidene norbornene or hexadiene; (c) a block copolymer that includes blocks of a first component of styrene or ethylene-butylene and blocks of a second component of butadiene, isoprene, ethylene-propylene, ethylene-butylene, ethylene-hexene, or ethylene-octene, wherein the first block component is different from the second block component; or (d) the reaction product of one of (a) and a compound selected from the group consisting of maleic anhydride, isopropenyl-α, α-dimethylbenzyl isocyanate ("TMI"), TMI grafted with a polyoxyalkylene amine, or hydroxypropyl methacrylate.

The polyolefin is most preferably polypropylene which is present in an amount of about 50 to 75 percent by weight, the first substantially amorphous polyolefin is present in an amount of about 15 to 40 percent by weight and the second substantially amorphous polyolefin is present in an amount of about 3 and 15 percent by weight. All component weights disclosed herein are calculated based on the total weight of the composition.

The invention also relates to an article of manufacture comprising one of the thermoplastic olefin compositions recited above in the form of a molded or extruded substrate having one or more surfaces, and a coating present on at least a portion of one or more of the surfaces of the substrate. A typical coating is a polyurethane. The coating is sufficiently adhered to the substrate as evidenced by resistance to immersion in gasoline for at least about 60 minutes and a coating peel area of less than 1% after immersion in gasoline for 30 minutes.

Having briefly summarized the invention, the invention will now be described more fully in the following detailed description and non-limiting examples. Unless otherwise specified, all percentages are by weight and all temperatures are in degrees Celsius.

DETAILED DESCRIPTION OF THE INVENTION

The primary component of the invention is a substantially crystalline polyolefin having two to four carbon atoms or a copolymer of propylene and an alpha-olefin having three to ten carbon atoms. Preferred polyolefin components include polyethylenes, polypropylenes or polybutylenes, or copolymers of propylene with propene, butene, hexene or octene.

The crystallinity of these components can vary from substantially amorphous to partially crystalline. As used herein, the terminology "crystalline or semi-crystalline polyolefin" refers to olefins that are characterized by a sufficient degree of crystallinity, e.g., about 70–100%, such that their behavior is substantially that of a crystalline polyolefin ("crystalline") or by a degree of crystallinity, e.g., about 30–70%, sufficient to cause their behavior to exhibit substantial but not full crystalline polyolefin behavior ("semi-crystalline"). When polypropylene is used as the crystalline or semi-crystalline polyolefin, the polypropylene has 30–98% crystallinity, and typically between 60 and 70% crystallinity, as determined by X-ray diffraction, differential scanning colorimetry or density measurements. The terminology "substantially crystalline" is used to designate those polyolefins having a crystallinity of between 30 and 98%.

Copolymers of ethylene and a $C_3$ to $C_{10}$ alpha olefin also may be used as the crystalline or semi-crystalline polyolefin. When a copolymer is utilized, the copolymer either can be in the form of a random copolymer, a block copolymer, or a graft copolymer. Copolymers of ethylene and propylene, butylene, hexene, or octene are preferred, but copolymers of ethylene and other $C_3$–$C_{10}$ alpha-olefins can also be used.

These copolymers can be prepared by copolymerizing the two olefins in the presence of free radical coordination stereospecific polymerization catalysts. Phillips catalyst, Ziegler-Natta catalysts, Kaminsky catalysts or metallocene catalysts. The latter produce copolymers having a narrow molecular weight distribution, i.e., (Mw/Mn) of less than 3, where Mw is the weight average molecular weight and Mn in the number average molecular weight. These copolymers generally contain ethylene in an amount of about 5 to 95% and preferably about 70 to 90% of the copolymer.

The polyolefin component is generally present in an amount of about 40 to 90, and preferably about 50 to 75, percent by weight. The first and second substantially amorphous polyolefins generally constitute up to about 60% of the compositions of the invention. The amounts of these components may individually constitute about 10 to 50 and about 1 to 20 weight percent, respectively. Preferably, the first substantially amorphous polyolefin is present in an amount of about 15 and 40 percent by weight, while the second substantially amorphous polyolefin component is present in an amount of about 3 to 15 percent.

The substantially amorphous polyolefin components employed in the invention may be any polyolefin or elastomer that is compatible or may be rendered compatible with the other ingredients of the blend. The term "compatible" is intended to mean that when the components of the blend are combined, the resultant blend can be molded, extruded or otherwise formed or shaped into commercially useful articles. The primary requirement is that the polyolefin can be dispersed into the composition. Fillers and coupling agents may be used to render chemically dissimilar components sufficiently compatible to be suitable in many cases.

The first substantially amorphous polyolefin should have a Mooney Viscosity ($ML_{1+4}$, 100° C.) of between about 10 and about 120, preferably from about 12 to about 80 and more preferably between about 15 and 50. Alternatively, the first substantially amorphous polyolefin may also have a number average molecular weight of between about 40,000 and 300,000. In this regard, the molecular weight of the first component may be between about 4 to 200 times, preferably about 8 to 40 times, that of the second component.

The first substantially amorphous polyolefin may be any one of a number of compounds which have the appropriate Mooney Viscosity recited above. One preferred component is a terpolymer of ethylene with a $C_3$–$C_{10}$ alpha-olefin and a diene monomer. A terpolymer of ethylene with propylene, butylene, hexene or octene and a diene monomer is most preferred. In these terpolymers, the ethylene content can be 20 to 80 mole percent, the alpha-olefin can be 20 to 80 mole percent and the diene can be from 2 to 20 mole percent. Useful diene monomers include, but are not limited to, those having between about 4 to 15 carbons, with dicyclopentadiene, ethylidene norbornene, isoprene, 1,4-butadiene, or 1,4-hexadiene being preferred. Terpolymers containing at least about 3% by weight of the diene monomer are advantageous, with terpolymers of ethylene, propylene with dicyclopentadiene as well as terpolymers of ethylene, propylene with ethylidene-norbornene being preferred.

The first substantially amorphous polyolefin may also include up to 25% of a copolymer of ethylene with a $C_3$–$C_{10}$ alpha-olefin in combination with the terpolymer. Copolymers of ethylene and propylene, butylene, hexene, or octene are preferred, but other copolymers of ethylene and $C_3$–$C_{10}$ alpha-olefins can also be used, if desired. The terpolymer may be present in an amount of about 5 to 30% by weight of the composition with the ethylene/$C_3$–$C_{10}$ alpha-olefin copolymer present in an amount of about 5 to 20% by weight.

These copolymers can be prepared by copolymerizing the two olefins in the presence of free radical coordination stereospecific polymerization catalysts, Phillips catalyst, Ziegler-Natta catalysts, Kaminsky catalysts or metallocene catalysts. The latter produce copolymers having a narrow molecular weight distribution, i.e., (Mw/Mn) of less than 3, where Mw is the weight average molecular weight and Mn in the number average molecular weight. These copolymers generally contain ethylene in an amount of about 5 to 95% and preferably about 70 to 90% of the copolymer.

The second substantially amorphous polyolefin should have a number average molecular weight of between about 1,000 and 15,000, and preferably about 3,000 to 12,000, and is present in an amount of about 3 to 15 percent by weight. Any one of a number of compounds which have the appropriate molecular weight may be used.

The second substantially amorphous polyolefin may be any one of a number of polyolefins having the recited molecular weight. Many of these components are high viscosity liquids. One component, designated (a), is a copolymer of ethylene with a $C_3$–$C_{10}$ alpha-olefin. Copolymers of ethylene and propylene, butylene, hexene, or octene are preferred, but other copolymers of ethylene and $C_3$–$C_{10}$ alpha-olefins can also be used, if desired.

It is also acceptable to utilize a terpolymer of ethylene with a $C_3$–$C_{10}$ alpha-olefin and a diene monomer, a component designated herein as (b). The same types of components described above for the first substantially amorphous polyolefin can be used, except that the molecular weight would be lower. A terpolymer of ethylene with propylene, butylene, hexene or octene and a diene monomer is preferred. In these terpolymers, the ethylene content can be 20 to 80 mole percent, the propylene can be 20 to 80 mole percent and the diene monomer can be from 2 to 20 mole percent.

Useful dienes include, but are not limited to, those having between about 4 to 15 carbons. Preferred diene compounds include those selected from the group consisting of dicyclopentadiene, ethylidene norbornene, isoprene, 1,4-butadiene, or 1,4-hexadiene, and preferred terpolymers contain at least about 3% by weight of the diene compound. Thus, preferred components include terpolymers of ethylene, propylene with dicyclopentadiene as well as terpolymers of ethylene, propylene with ethylidene-norbornene.

Another suitable second substantially amorphous polyolefin is a block copolymer, designated herein as (c), that includes that includes blocks of a $C_3$–$C_{10}$ alpha-olefin, styrene, alpha-methyl styrene, isoprene or butadiene. Preferred block copolymers include blocks of a first component of styrene or ethylene-butylene and blocks of a second component of ethylene-propylene, ethylene-butylene, ethylene-hexene, or ethylene-octene, wherein the first block component is different from the second block component.

Block copolymers which offer an excellent compromise of cost and performance are the styrene-containing block copolymers, such as styrene-ethylene-propylene, styrene-ethylene-butylene, styrene-ethylene-hexene, and styrene-ethylene-octene.

The following is a list of specific substantially amorphous block polyolefins which may be employed in the invention:

| Name | Type | Supplier |
|---|---|---|
| Polysar xG006 | Ethylene-Propylene-ENB | Polysar |
| Nordel 2722 | Ethylene-Propylene-Hexadiene | DuPont |
| Nordel 1320 | Ethylene-Propylene-diene | DuPont |
| Vistalon 2504 | Ethylene-Propylene-diene | Exxon |
| Kraton G 11650 | Styrene-Ethylene-Butene Styrene | Shell |
| Stereon 840 A | Styrene-Butadiene | Firestone |
| GE 7340 | Hydrogenated Styrene-Butadiene | Goldsmith & Eggleton |
| Natsyn 220 | Polyisoprene | Goodyear |
| Dutral TER 4033 | Ethylene-Propylene-diene | Enichem |
| Royalene 521 | Ethylene-Propylene-diene-ENB | Uniroyal |
| EPDM 345 | Ethylene-Propylene-diene-ENB | Polysar/Miles |
| Engage 8150 | Ethylene-Octene | Dow |
| Exxact 4033 | Ethylene-Butene | Exxon |

Additional low molecular weight second substantially amorphous polyolefins include the reaction product of one of (a), (b) or (c) and a compound that provides a polar functional group. The polar functional group compound may be a $C_1$ to $C_{10}$ carboxylic anhydride, an isocyanate compound, or an acrylate or methacrylate compound. Specifically, compounds of maleic anhydride, TMI, TMI grafted with a polyoxyalkylene amine, or hydroxypropyl methacrylate are preferred. Particularly useful copolymers include those of polypropylene with polystyrene-co-acrylonitrile, especially copolymers of polypropylene polystyrene-co-acrylonitrile grafted with carboxylic acid anhydrides and polypropylene grafted in styrene-co-hydroxypropyl methacrylate. Useful carboxylic anhydrides include phthalic anhydride, and particularly maleic anhydride.

The low molecular weight second substantially amorphous polyolefin can also be a copolymer of polypropylene with a polar compound such as polystyrene, polyester, polyurethane, an acrylic compound, or a mixture thereof, such as the well-known copolymers of polystyrene-co-acrylonitrile. Particularly useful components include commercially available copolymers of polystyrene-co-acrylonitrile grafted with maleic anhydride, and commercially available copolymers of polypropylene grafted with poly(styrene-hydroxypropyl methacrylate).

It is known that paints adhere to polymer blends through the use of an adhesion promoter. In conventional polymer blends, a crystalline material such as polypropylene is mixed with an ethylene-propylene rubber component. The rubber particles present on the surface of an article molded from the blend provide sites to which the adhesion promoter can bond. The surface morphology of these molded articles shows the rubber particles as "islands" in a "sea" of the crystalline material. Thus, the adhesion promoter bonds with these islands and bridges between adjacent islands.

Without wishing to be bound by theory, it is believed that in the present invention, that the use of both high and low molecular weight amorphous ethylene-propylene-diene polyolefin components provides an enhanced surface morphology, with many more "islands" to which the adhesion promoter can attach, while providing shorter bridges between islands. This provides a more secure bond for the adhesion promoter and thus a surface which is more receptive to paint and which bonds more strongly thereto. In addition, it is believed that these terpolymers provide a stronger bond between the adhesion promoter and the amorphous polyolefin, possibly due to the enhanced permeability of the terpolymers.

The polymer blends of the invention have excellent paintability, a broad range of stiffness values, as well as high impact and tensile strengths which make them suitable for automotive applications. The polymer compositions of the invention can be molded or otherwise formed or shaped to produce articles that are light-weight, durable, and have surfaces that are paint receptive. The articles can be treated with an adhesion promoter and then painted, and the paint cured at temperatures exceeding 80° C. to produce a durable and attractive finish. Any of the conventional adhesion promoters can be used with good results.

The polymer blends of the invention can be coated with paints, particularly with paints such as commercially available two-component polyurethanes, to provide products with superior fluid resistance. The blends of the invention also may be coated with paints which have active functional groups such as acrylics, polyesters, epoxy resins, carbodiimides, urea resins, melamine-formaldehyde resins, enamines, ketimines, amines, and isocyanates to provide products with improved fluid resistance. These types of paints are well known in the paint and coatings industry.

Various additives can be incorporated into the polymer blends of the invention to vary the physical properties of the blends of the invention while retaining good paint adhesion. These additives may include pigments, dyes, processing aids, anti-static additives, surfactants and stabilizers such as those which generally are used in polymeric compositions. Particularly useful additives may include styrene-maleic anhydride copolymers and cationic surfactants for improving moisture resistance, and well known copolymers such as ethylene-acrylic acid copolymers ("EAA") and ethylene-methacrylic acid copolymers ("EMAA"), or mixtures or blends thereof.

The fluid resistance of preforms of the polymer blends of the invention bearing a coating of a two part commercially available polyurethane is evaluated by placing the coated preforms into a gasoline bath. The gasoline bath may be mixtures of any of 90% unleaded gasoline and 10% ethanol; 90% unleaded gasoline and 10% methanol; or 100% unleaded gasoline. The preforms employed are 2½" squares, or possibly 1"×3" bars. The coated preform remains immersed in the gasoline bath until failure, that is, paint at the edges of the preform curls away from the preform. The coated preform then is removed from the bath and the time to failure recorded. The fluid resistance of the coated preforms are shown in Table 1.

The % peel of the paint from the preform also is a measure of the ability of the preform to retain paint against the action of petroleum fluids such as gasoline. The painted preform is removed from the gasoline bath after a 30-minute immersion and measuring the area, if any, that is free of paint. The % peel is determined by dividing the area of the preform free of paint by the original painted area of the preform. Low % peel is desired.

EXAMPLES

The invention will now be described by reference to the following non-limiting examples.

Examples 1–11

The blends of Examples 1–11 are formed by blending the components in the amounts given in Table 1. Blending of the components is performed by well known methods and devices such as Banbury mixers and extrusion equipment. The polymer blends can be molded into shaped preforms by known methods such as extrusion, injection molding, blow molding, or thermoforming. The shaped preforms of the polymer blends are coated with a single layer of paint of two-part polyurethanes in accordance with well known methods such as spraying. The polymer blends also can be pelletized for storage and shipment prior to molding into shaped articles.

TABLE I

| COMPONENT (%) | EX 1 | EX 2 | EX 3 | EX 4 | EX 5 | EX 6 | EX 7 | EX 8 | EX 9 | EX 10 | EX 11 |
|---|---|---|---|---|---|---|---|---|---|---|---|
| Polypropylene[1] | 70 | 65 | 60 | 60 | 60 | 60 | 60 | 60 | 60 | 55 | 60 |
| Ter-(EPDM)-E[2] | 20 | 25 | 30 | 30 | 30 | 30 | 30 | 30 | | | |
| T-CP80[3] | | | | 10 | | | | | | | |
| T-68-ENB[4] | | | | | 10 | | | | | | |
| T-65-DCPD[5] | | | | | | | | 10 | | | |
| T-55-DCPD[6] | 10 | 10 | 5 | | | | | | 10 | 5 | 5 |
| T-67-ENB[7] | | | | | | 10 | | | | | |
| A3500[8] | | | | | | | | | 10 | 5 | 5 |
| Gasoline Resistance[9] | >30 | >30 | >30 | 20 | 23 | 25 | 25 | 60 | >150 | >90 | >30 |
| % PEEL[10] | 0 | 0 | 0 | <7 | <5 | <5 | <5 | 0 | 0 | 0 | 0 |

Notes:
[1]Polypropylene of MW >100,000
[2]Ter polymer of ethylene-propylene-diene, Mooney Viscosity of 45 (ML$_{1+2}$, 100° C.) from Uniroyal Chemical Co.
[3]Low molecular weight ethylene-propylene copolymer: % dieve, C2/C3 = 43/57, Mv = 7,200
[4]Ethylene-propylene-[ethylidene-norbornene] with C2:C3 of 45:55 from Uniroyal Chemical Co.
[5]10% ter of Dicyclopentadiene with a C$_2$:C$_3$ = 48:52, Mn = 7000, available from Uniroyal Chemical Co.
[6]13% ter of Dicyclopentadiene with a C$_2$:C$_3$ = 49:51, Mn = 5200, available from Uniroyal Chemical Co.
[7]9% ter of Ethylene norbornene with C$_2$:C$_3$ of 46:54, Mn = 7500, available from Uniroyal Chemical Co.
[8]Graft copolymer of polypropylene with poly(styrene-hydroxypropyl methacrylate) from Nippon Oil and Fat Co.
[9]Minutes to failure; gasoline bath of 90% unleaded gasoline and 10% ethanol.
[10]% peel of coating after 30 minutes immersion in above gasoline bath

Comparison Examples 12–16

Comparison examples 12–16 are produced in the same manner as Examples 1–11 except that the first and second ethylene-propylene-diene amorphous polyolefins are not employed. The compositions and the fluid resistance of these comparative examples is shown in Table II.

TABLE II

| COMPONENT (%) | EX. 12 | EX. 13 | EX. 14 | EX. 15 | EX.16 |
|---|---|---|---|---|---|
| POLYPROPYLENE[1] | 70 | 70 | 70 | 70 | 70 |
| ETHYLENE-PROPYLENE COPOLYMER[2] | 30 | | | | |
| ETHYLENE-PROPYLENE COPOLYMER[3] | | 30 | | | |
| ETHYLENE-PROPYLENE COPOLYMER[4] | | | 30 | | |
| ETHYLENE-PROPYLENE COPOLYMER[5] | | | | 30 | |
| ETHYLENE-PROPYLENE COPOLYMER[6] | | | | | 30 |
| GASOLINE RESISTANCE[7] | 5 | 7 | 11 | <10 | 12 |
| % PEEL[8] | >90 | >90 | >90 | >90 | >90 |

Notes:
[1] Polypropylene of molecular weight of more than 100,000
[2] Ethylene-propylene copolymer of 72% ethylene, 28% polypropylene, MW = 70,000
[3] Ethylene-propylene copolymer of 72% ethylene, 28% polypropylene, MW = 50,000
[4] Ethylene-propylene copolymer of 76% ethylene, 24% polypropylene, MW = 50,000
[5] Ethylene-propylene copolymer of 76% ethylene, 24% polypropylene, MW = 50,000
[6] Ethylene-propylene copolymer of 76% ethylene, 24% polypropylene, MW = 50,000
[7] Minutes to failure; gasoline bath of 90% unleaded gasoline and 10% ethanol
[8] % peel at 30 minutes Upon reviewing these data, it is seen that both the high and low molecular weight components are necessary to obtain enhanced paint bonding to the molded polymer blend as shown by the comparison gasoline resistance to peel for the samples of Table 1 and Table II.

Examples 17–24

The blends of Examples 17–24 are formed by blending the components in the amounts given in Table III. Blending of the components is performed by well known methods and devices such as Banbury mixers and extrusion equipment. The polymer blends can be molded into shaped preforms by known methods such as extrusion, injection molding, blow molding, or thermoforming. The polymer blends also can be pelletized for storage and shipment prior to molding into shaped articles. The shaped preforms of the polymer blends are coated with a single layer of paint of two-part polyurethanes in accordance with well known methods such as spraying.

TABLE III

| COMPONENT (%) | EX 17 | EX 18 | EX 19 | EX 20 | EX 21 | EX 22 | EX 23 | EX 24 |
|---|---|---|---|---|---|---|---|---|
| PP[1] | 70 | 65 | 65 | 60 | 60 | 60 | 60 | 60 |
| EPDM-S[2] | 20 | 25 | 30 | 30 | 30 | 30 | 30 | 30 |
| T-55-DCPD[3] | 10 | 10 | 5 | | | | | 10 |
| T-CP80[4] | | | | 10 | | | | |
| T-68-ENB[5] | | | | | 10 | | | |
| T-65-DCPD[6] | | | | | | | 10 | |
| T-67-ENB[7] | | | | | | 10 | | |
| Gasoline Resistance | >30 | >30 | >30 | 20 | 23 | 25 | 25 | 60 |
| % Peel | 0 | 0 | 0 | <7 | <5 | <5 | <5 | 0 |

Notes:
[1] PP = Polypropylene of MW > 1,000,000
[2] EPDM-S = 5% Ethylidene norbornene, C2/C3 = 52/48, Mooney Viscosity = 45 ($ML_{1+4}$, 100° C.)
[3] T-55-DCPD = 13% Dicyclopentadiene C2/C3 = 49/51, MW = 5,200 Mn
[4] T-CP80 = 0% diene, C2/C3 = 43/57, Mv = 7,200
[5] T-68-ENB- = 3% Ethylidene-norbornene, C2/C3 = 45/55 Mv = 4,000
[6] T-65-DCPD = 9.5% Dicyclopentadiene, C2/C3 = 48/52 Mv = 7,000
[7] T-67-ENB = 9.5% Ethylidene-norbornene, C2/C3 = 46/54 Mv = 8000

The notation Mn is used to define number average molecular weight, while Mv is used to define viscosity average molecular weight

Examples 25–32

Additional blends are formed by blending the components in the amounts given in Table IV.

TABLE IV

| COMPONENT (%) | EX 25 | EX 26 | EX 27 | EX 28 | EX 29 | EX 30 | EX 31 | EX 32 |
|---|---|---|---|---|---|---|---|---|
| Polypropylene[1] | 60 | 55 | 60 | 65 | 65 | 65 | 65 | 65 |
| EPDM-S[2] | 20 | 35 | 30 | | | | | |
| EPDM-I[3] | | | | 30 | 30 | | | |
| EPDM-K[4] | | | | | | 30 | | |
| EPDM-G[5] | | | | | | | 30 | |
| EPDM-A[6] | | | | | | | | 25 |
| T-55-DCPD[7] | 10 | 5 | 5 | 5 | | 5 | 5 | 10 |

TABLE IV-continued

| COMPONENT (%) | EX 25 | EX 26 | EX 27 | EX 28 | EX 29 | EX 30 | EX 31 | EX 32 |
|---|---|---|---|---|---|---|---|---|
| A-3500[8] | 10 | 5 | 5 | | | | | |
| T-M201[9] | | | | | 5 | | | |
| Gasoline Resistance[10] | >150 | >90 | >30 | >60 | >60 | >60 | >60 | >60 |
| % Peel[11] | 0 | 0 | 0 | 0 | 0 | 0 | 0 | 0 |

Notes:
[1]PP = Polypropylene of MW > 100,000
[2]EPDM-S = 5% Ethylidene norbornene, C2/C3 = 52/48, Mooney Viscosity = 45 ($ML_{1+4}$, 100° C.)
[3]EPDM-I = 4% Ethylidene-norbornene, C2/C3 = 58/42, Mooney Viscosity = 35 ($ML_{1+4}$, 100° C.)
[4]EPDM-K = 4.1% Ethylidene-norbornene, C2/C3 = 61/39, Mooney Viscosity = 44 ($ML_{1+4}$, 100° C.)
[5]EPDM-G = 4.4% Ethylidene-norbornene, C2/C3 = 50/50, Mooney Viscosity = 40 ($ML_{1+4}$, 100° C.)
[6]EPDM-A = 4.6% Hexadiene; C2/C3 = 52/48, Mooney Viscosity = 29 ($ML_{1+4}$, 100° C.)
[7]T-55-DCPD = 13% Dicyclopentadiene C2/C3 = 49/51, MW = 5,200 Mn
[8]A-3500 = graft copolymer of polypropylene with poly(styrene-hydroxypropyl methacrylate)
[9]T-M201 = 13% Dicyclopentadiene, 4% Maleic Anhydride C2/C3 = 49/51, MW = 6500 Mn
[10]Minutes to failure: gasoline bath of 90% unleaded gasoline and 10% ethanol
[11]% peel at 30 minutes Examples 33–39

Additional blends are formed by blending the components the amounts given in Table V.

TABLE V

| COMPONENT (%) | EX 33 | EX 34 | EX 35 | EX 36 | EX 37 | EX 38 | EX 39 |
|---|---|---|---|---|---|---|---|
| Polypropylene[1] | 60 | 55 | 60 | 65 | 65 | 65 | 65 |
| EPDM-I[2] | 15 | 15 | 15 | 15 | 15 | 15 | 15 |
| EPDM-D[3] | 13 | | | | | | 13 |
| EPDM-E[4] | | 13 | | | | | |
| EB-1[5] | | | 13 | | | | |
| EB-2[6] | | | | 13 | | | |
| EO[7] | | | | | 13 | | |
| EPR-A[8] | | | | | | 13 | |
| T-55-DCPD[9] | 7 | 7 | 7 | 7 | 7 | 7 | |
| MA-Mod1[10] | | | | | | | 7 |
| Gasoline Resistance[11] | >60 | >60 | >60 | >60 | >60 | >60 | >60 |
| % Peel[12] | 0 | 0 | 0 | 0 | 0 | 0 | 0 |

Notes:
[1]PP = Polypropylene of MW > 100,000
[2]EPDM-I = 4% Ethylidene-norbornene, C2/C3 = 58/42, Mooney Viscosity = 35 ($ML_{1+4}$, 100° C.)
[3]EPDM-D 5% Ethylidene norbornene C2/C3 = 71/29 Mooney Viscosity = 26 ($ML_{1+4}$ 100° C.)
[4]EPDM-E 3% Ethylidene-norbornene, C2/C3 = 75/25 Mooney Viscosity = 25 ($ML_{1+4}$ 100° C.)
[5]EB-1 = 0% diene, C2/C4 = 79/21 Mooney Viscosity = 28 ($ML_{1+4}$ 125° C.) MW = 58,000 Mn
[6]EB-2 = 0% diene, C2/C4 = 85/15 Mooney Viscosity = 19 ($ML_{1+4}$ 125° C.)
[7]EO = 0% diene, C2/C8 = 80/20 Mooney Viscosity = 23 ($ML_{1+4}$ 121° C.) MW = 50–60,000 Mn, 1 MI(190° C.)
[8]EPR-A = 0% diene, C2/C3 = 68/32 Mooney Viscosity = 36 ($ML_{1+4}$ 100° C.)
[9]T-55-DCPD = 13% Dicyclopentadiene, C2/C3 = 49/51, MW = 5,200 Mn
[10]MA-Mod1 = Maleic Anhydride functionalized (Ethylene and alpha-olefin oligomer), 5% maleic anhydride, MW = 3,000 Mn
[11]Minutes to failure; gasoline bath of 90% unleaded gasoline and 10% ethanol
[12]% peel at 30 minutes Examples 40–47

Additional blends are formed by blending the components in the amounts given in Table VI.

TABLE VI

| COMPONENT (%) | EX 40 | EX 41 | EX 42 | EX 43 | EX 44 | EX 45 | EX 46 | EX 47 |
|---|---|---|---|---|---|---|---|---|
| Polypropylene[1] | 65 | 65 | 65 | 65 | 65 | 65 | 65 | 60 |
| EPDM-I[2] | 15 | 15 | 15 | 15 | 15 | 15 | 15 | 20 |
| EPDM-D[3] | | | | | | 15 | 15 | 15 |

TABLE VI-continued

| COMPONENT (%) | EX 40 | EX 41 | EX 42 | EX 43 | EX 44 | EX 45 | EX 46 | EX 47 |
|---|---|---|---|---|---|---|---|---|
| EPR-A[4] | 12 | 12 | 12 | 12 | 12 | | | |
| EXP-1[5] | 8 | | | | | | | |
| EXP-2[6] | | 8 | | | | | | |
| EXP-3[7] | | | 8 | | | | | |
| EXP-4[8] | | | | 8 | | | | |
| EXP-5[9] | | | | | 8 | | | |
| EPDM-TMI[10] | | | | | | 5 | | |
| EPDM-TMI[11] | | | | | | | 5 | |
| Polyamine A-3500[12] | | | | | | | | 5 |
| Gasoline Resistance[13] | >60 | >60 | >60 | >60 | >60 | >120 | >120 | 75 |
| % Peel[14] | 0 | 0 | 0 | 0 | 0 | 0 | 0 | 0 |

Notes:
[1]PP = Polypropylene of MW > 100,000
[2]EPDM-I = 4% Ethylidene-norbornene, C2/C3 = 58/42, Mooney Viscosity = 35 ($ML_{1+4}$, 100° C.)
[3]EPDM-D 5% Ethylidene norbornene, C2/C3 = 71/29 Mooney Viscosity = 26 ($ML_{1+4}$ 100° C.)
[4]EPR-A = 0% diene, C2/C3 = 68/32, Mooney Viscosity = 36 ($ML_{1+4}$ 100° C.)
[5]EXP-1 = isoprene co-butadiene, diene = 7%, C2/C4 = 49/51, MW = 10,500 Mn
[6]EXP-2 = isoprene polybutadiene, diene = 0%, C2/C4 = 51/49, MW = 8,700 Mn
[7]EXP-3 = isoprene-butadiene-isoprene, diene = 13%, C2/C4 = 53/47, MW = 11,500 Mn
[8]EXP-4 = isoprene-butadiene-isoprene, diene = 24%, C2/C4 = 54/46, MW = 8,500 Mn
[9]EXP-5 = isoprene polybutadiene, diene = 4%, C2/C4 = 49/51, MW = 9,000 Mn
[10]EPDM-TMI = (EPDM-S/T-55-DCPD) m.b. grafted unsaturated aliphatic isocyanate (0.4–1 wt. %)
[11]EPDM-TM-Polyamine = EPDM-TMI grafted with polyoxyalkylene-amine
[12]A-3500 = graft copolymer of polypropylene with poly(styrene-hydroxypropyl methacrylate)
[13]Minutes to failure: gasoline bath of 90% unleaded gasoline and 10% ethanol
[14]% peel at 30 minutes Examples 48–51

Additional blends are formed by blending the components in the amounts given in Table VII.

TABLE VII

| COMPONENT (%) | EX48 | EX49 | EX50 | EX51 |
|---|---|---|---|---|
| Polypropylene[1] | 60 | 60 | 60 | 60 |
| EPDM-I[2] | 20 | 20 | 20 | 20 |
| EPDM-D[3] | 15 | 15 | 15 | 15 |
| S-EP-1[4] | 5 | | | |
| S-EP-2[5] | | 5 | | |
| S-EB-S1[6] | | | 5 | |
| S-EB-S2[7] | | | | 5 |
| Gasoline Resistance[8] | 25 | 30 | 30 | 30 |
| % Peel[9] | 0 | 0 | 0 | 0 |

Notes:
[1]PP = Polypropylene of MW > 100,000
[2]EPDM-I = 4% Ethylidene-norbornene, C2/C3 = 58/42, Mooney Viscosity = 35 ($ML_{1+4}$, 100° C.)
[3]EPDM-D 5% Ethylidene norbornene C2/C3 = 71/29 Mooney Viscosity = 26 ($ML_{1+4}$ 100° C.)
[4]S-EP-1 = Styrenic Block Copolymer, Styrene-Ethylene-Propylene Diblock (37% Styrene)
[5]S-EP-2 = Styrenic Block Copolymer, 70% Styrene-Ethylene-Propylene Diblock/30% Styrene-Ethylene-Propylene-Styrene triblock
[6]S-EB-S1 = Styrenic Block Copolymer, Styrene-Ethylene-Butylene-Styrene Triblock (29% Styrene)
[7]S-EB-S2 = Styrenic Block Copolymer, 2% Maleic Anhydride on Styrene-Ethylene-Butene-Styrene Triblock
[8]Minutes to failure: gasoline bath of 90% unleaded gasoline and 10% ethanol
[9]% peel at 30 minutes Other aspects of the invention will be apparent to those skilled in the art from consideration of the specification, or from practice of the invention disclosed herein. It is intended that the specification and examples be considered as exemplary only, with the scope and spirit of the invention being indicated by the following claims.

What is claimed is:

1. A thermoplastic polyolefin composition consisting essentially of:

a polyolefin that is a homopolymer of ethylene, propylene or butylene or a copolymer of propylene and a $C_3$–$C_{10}$ alpha-olefin;

about 10% to 50% by weight of the composition of a first substantially amorphous polyolefin comprising a terpolymer of ethylene with a $C_3$–$C_{10}$ alpha-olefin and a diene monomer and having a Mooney Viscosity ($ML_{1+4}$, 100° C.) of between about 10 and about 120, said first polyolefin optionally being present with a copolymer of ethylene and a $C_3$–$C_{10}$ alpha-olefin; and about 1 to 20% by weight of the composition of a second substantially amorphous polyolefin having a number average molecular weight of between about 1,000 and 15,000 and comprising:

(a) a copolymer of ethylene with a $C_3$–$C_{10}$ alpha-olefin;

(b) a terpolymer of ethylene with a $C_3$–$C_{10}$ alpha-olefin and a diene monomer;

(c) a block copolymer that includes blocks of a $C_3$–$C_{10}$ alpha-olefin, butadiene, isoprene, styrene or alpha-methyl styrene;

(d) the reaction product of one of (a), (b) or (c) with a compound that provides a polar functional group, or (e) a mixture thereof.

2. The composition of claim 1 wherein the polyolefin is a polypropylene having at least 30 to 98% crystallinity and which is present in an amount of about 40 to 90 percent by weight of the composition.

3. The composition of claim 1 wherein the first substantially amorphous polyolefin is a mixture of the terpolymer in an amount of about 5 to 30% by weight of the composition and the ethylene/$C_3$–$C_{10}$ alpha-olefin copolymer in an amount of about 5 to 20% by weight of the composition.

4. The composition of claim 3 wherein the terpolymer of the first substantially amorphous polyolefin is ethylene with propylene, butylene, hexene or octene and a diene compound, and the ethylene/$C_3$–$C_{10}$ alpha-olefin copolymer is a copolymer of ethylene with propylene, butylene, hexene or octene.

5. The composition of claim 1 wherein the first substantially amorphous polyolefin has a Mooney Viscosity (ML$_{1+4}$, 100° C.) of between about 15 and 50 and is present in an amount of about 15 and 40 percent by weight of the composition, with the alpha-olefin being propylene, ethylene-propylene, butylene, hexene or octene.

6. The composition of claim 1 wherein the first substantially amorphous polyolefin is a terpolymer containing at least about 3% by weight of a diene compound of dicyclopentadiene, ethylidene norbornene, hexadiene, isoprene or butadiene.

7. The composition of claim 1 wherein the second substantially amorphous polyolefin is a liquid having a number average molecular weight of about 3,000 to 12,000 and is present in an amount of about 3 to 15 percent by weight of the composition, with the alpha-olefin of (a), (b), (c), (d) or (e) being propylene, butylene, hexene or octene.

8. The composition of claim 7 wherein the alpha-olefin of component (a) or (b) of the second substantially amorphous polyolefin is ethylene with propylene, butylene, hexene or octene; the diene monomer of component (b) is dicyclopentadiene, ethylidene norbornene, hexadiene, isoprene or butadiene; the block copolymer of component (c) includes blocks of (a) or (b) and ethylene, ethylene-butylene, styrene, butadiene or isoprene; or the reaction product of component (d) is a compound selected from the group consisting of a C$_1$ to C$_{10}$ carboxylic anhydride, an isocyanate compound, and an acrylate or methacrylate compound.

9. The composition of claim 7 wherein the second substantially amorphous polyolefin is a terpolymer containing at least about 3% by weight of a diene compound selected from the group consisting of dicyclopentadiene, ethylidene norbornene and hexadiene; (c) a block copolymer that includes blocks of a first component of styrene or ethylene-butylene and blocks of a second component of butadiene, isoprene, ethylene-propylene, ethylene-butylene, ethylene-hexene, or ethylene-octene, wherein the first block component is different from the second block component; or (d) the reaction product of one of (a) and a compound selected from the group consisting of maleic anhydride, isopropenyl-α, α-dimethylbenzylisocyanate, isopropenyl-α, α-dimethylbenzylisocynate grafted with a polyoxyalkylene amine, and hydroxypropyl methacrylate.

10. The composition of claim 8 wherein the mixture (e) of the second substantially amorphous polyolefin is the combination of in an amount of about 5 to 10% by weight (a) or (b) in an amount of about 5 to 10% by weight with (c) or (d) in an amount of about 5 to 10% by weight.

11. The composition of claim 1 wherein the polyolefin is polypropylene and is present in an amount of about 50 to 75 percent by weight, the first substantially amorphous polyolefin is present in an amount of about 15 to 40 percent by weight and the second substantially amorphous polyolefin is present in an amount of about 3 and 15 percent by weight, all weights calculated based on the total weight of the composition.

12. The composition of claim 3 wherein the terpolymer of the first substantially amorphous polyolefin is present in an amount of between about 10 to 25% by weight, the second substantially amorphous polymer is present in a amount of about 5 to 15% by weight.

13. The composition of claim 12 wherein the terpolymer is present in a greater amount than the alpha-olefin copolymer and the second substantially amorphous polyolefin is a mixture of in an amount of about 5 to 10% by weight (a) or (b) in an amount of about 5 to 10% by weight with (c) or (d) in an amount of about 5 to 10% by weight.

14. The composition of claim 13 wherein, in the mixture of the second substantially amorphous polyolefin, the block copolymer of component (c) includes blocks of (a) or (b) and ethylene, ethylene-butylene, styrene or butadiene or the reaction product of component (d) is a compound (d) is a compound selected from the group consisting of a C$_1$ to C$_{10}$ carboxylic anhydride, an isocyanate compound and acrylate or methacrylate compound.

15. The composition of claim 13 wherein the mixture of the second substantially amorphous polyolefin is the terpolymer (b) in an amount of about 5 to 10% by weight and (d) the reaction product of one of (a) and a compound selected from the group consisting of maleic anhydride, isopropenyl-α,α-dimethylbenzylisocyanate, isopropenyl-α, α-dimethylbenzylisocynate grouped with a polyoxyalkylene amine and hydroxypropyl methacrylate, with component (d) being present in an amount of about 5 to 10% by weight.

16. An article of manufacture comprising the thermoplastic olefin composition of claim 1 in the form of a molded or extruded substrate having one or more surfaces, and a coating present on at least a portion of one or more of the surfaces of the substrate.

17. The article of claim 16 wherein the coating is a polyurethane.

18. The article of claim 16 wherein the coating is sufficiently adhered to the substrate as evidenced by resistance to immersion in gasoline for at least about 60 minutes and a coating peel area of less than 1% after immersion in gasoline for 30 minutes.

* * * * *